United States Patent
Finateu et al.

(10) Patent No.: US 12,513,421 B2
(45) Date of Patent: Dec. 30, 2025

(54) MONITORING AN EVENT QUEUE IN AN EVENT-BASED VISION SENSOR TO ACCOUNT FOR EVENT BURSTS

(71) Applicant: PROPHESEE, Paris (FR)

(72) Inventors: Thomas Finateu, Veneux les sablons (FR); Tjaart Opperman, Paris (FR)

(73) Assignee: PROPHESEE, Paris (FR)

( * ) Notice: Subject to any disclaimer, the term of this patent is extended or adjusted under 35 U.S.C. 154(b) by 74 days.

(21) Appl. No.: 18/660,930

(22) Filed: May 10, 2024

(65) Prior Publication Data
US 2024/0380993 A1 Nov. 14, 2024

(30) Foreign Application Priority Data
May 11, 2023 (EP) ..................................... 23315188

(51) Int. Cl.
*H04N 25/47* (2023.01)
*H04N 25/707* (2023.01)
*H04N 25/78* (2023.01)

(52) U.S. Cl.
CPC ........... *H04N 25/47* (2023.01); *H04N 25/707* (2023.01); *H04N 25/78* (2023.01)

(58) Field of Classification Search
CPC ....... H04N 25/47; H04N 25/707; H04N 25/78
See application file for complete search history.

(56) References Cited

U.S. PATENT DOCUMENTS

| | | | |
|---|---|---|---|
| 11,558,565 B2 * | 1/2023 | Niwa | H04N 25/443 |
| 2020/0410272 A1 | 12/2020 | Seo et al. | |
| 2021/0258525 A1 * | 8/2021 | Matolin | H04N 25/76 |
| 2023/0025549 A1 * | 1/2023 | Segura Puchades | H04N 25/74 |

FOREIGN PATENT DOCUMENTS

WO 2022136514 A1 6/2022

OTHER PUBLICATIONS

Belbachir et al.; "Performance evaluation of the ultra high-speed synchronous arbitration for transient pixels' events"; IEEE International Conference on Industrial Technology; Mar. 2009; 4 Pages.
Extended European Search Report in European Patent Application No. 23315188.5; Oct. 30, 2023; 4 pages.

* cited by examiner

*Primary Examiner* — Lin Ye
*Assistant Examiner* — Chriss S Yoder, III

(57) ABSTRACT

An event-based vision sensor, comprises an array of event-based pixels, each pixel configured to record events based on variations of a sensed photocurrent and enable, at the occurrence of an event, a request line common to pixels aligned along an axis of the array; a request arbiter configured to respond asynchronously to the enabled request lines by enqueuing corresponding line readout requests in a request queue; an event readout circuit connected to the request arbiter and configured to readout in parallel the events of a line of pixels corresponding to a current line readout request served by the arbiter; a queue length counter connected to the request lines to produce the request queue length; a queue monitor connected to the queue length counter, configured to generate an event burstiness indicator; and means configured to carry out a burstiness compensation action based on the event burstiness indicator.

5 Claims, 2 Drawing Sheets

MONITORING AN EVENT QUEUE IN AN EVENT-BASED VISION SENSOR TO ACCOUNT FOR EVENT BURSTS

CROSS-REFERENCE TO RELATED APPLICATION

This application is based on and claims priority under 35 U.S.C. 119 to European Patent Application No. 23315188.5 filed on May 11, 2023, the disclosure of which is herein incorporated by reference in its entirety.

TECHNICAL FIELD

The present disclosure relates to event-based vision sensors generally and, more particularly, to the processing of an event queue in situations where events occur in bursts.

BACKGROUND

FIG. 1 shows a block-diagram of a typical event-based vision sensor. It comprises an array of pixels 10 wherein each pixel is configured to produce events asynchronously as contrast changes are detected in the pixel. Each event represents a relative increase or decrease in light intensity that exceeds a threshold. An arbiter 12 assigned to the array detects the events and, with the aid of a control circuit 14, organizes their readout synchronously through a readout circuit 16, at the pace of a system clock CK. Upon readout, each event is assigned a timestamp TS, its coordinates (X, Y) in the array, its signed threshold level A, and is placed in an event stream ESTRM for transmission and further processing in an application program.

With such a configuration, situations occur that may cause a disparity between the assigned timestamps and the actual occurrence of the events.

SUMMARY

An event-based vision sensor generally comprises an array of event-based pixels, each pixel configured to record events based on variations of a sensed photocurrent and enable, at the occurrence of an event, a request line common to pixels aligned along an axis of the array; a request arbiter configured to respond asynchronously to the enabled request lines by enqueuing corresponding line readout requests in a request queue, and serve the request queue sequentially; an event readout circuit connected to the request arbiter and configured to readout in parallel the events of a line of pixels corresponding to a current line readout request served by the arbiter, and transmit the read-out events with a timestamp indicative of the time of readout in an event stream; a queue length counter connected to the request lines to produce the request queue length as the number of enabled request lines; a queue monitor connected to the queue length counter, configured to generate an event burstiness indicator based on the current request queue length; and means configured to carry out a burstiness compensation action based on the event burstiness indicator.

The readout circuit may be configured to insert successive event burstiness indicator values in the event stream, and the sensor may further comprise a processor receiving the event stream and programmed to apply processing measures on the event stream in response to the event burstiness indicator values.

The burstiness indicator may be the queue length and the arbiter may be controlled, when the queue length exceeds a threshold, to subsample the request queue such that only requests corresponding to regions of interest of the pixel array are served, and to reset resulting unserved requests in the request queue.

The sensor may further comprise a row request arbiter configured to serve row readout requests enqueued in a row request queue; a row readout circuit associated with the row request arbiter; a column request arbiter configured to serve column readout requests enqueued in a column request queue; a column readout circuit associated with the column request arbiter; a row queue length counter and a column queue length counter respectively assigned to the row and column request queues; the request queue monitor associated with the row and column request arbiters, to: activate the row request arbiter for serving the row request queue when the row request queue length exceeds the column request queue length by a threshold, and activate the column request arbiter for serving the column request queue when the column request queue length exceeds the row request queue length by a threshold.

The row and column request arbiters may be configured to operate simultaneously to enqueue the respective row and column readout requests and the request queue monitor may be configured to reset the request queue of an arbiter switched from an active state to an inactive state.

BRIEF DESCRIPTION OF THE FIGURES

Embodiments will be exposed in the following description provided for exemplary purposes only, in relation to the appended drawings, in which.

DETAILED DESCRIPTION OF THE EMBODIMENTS

Figure 1:
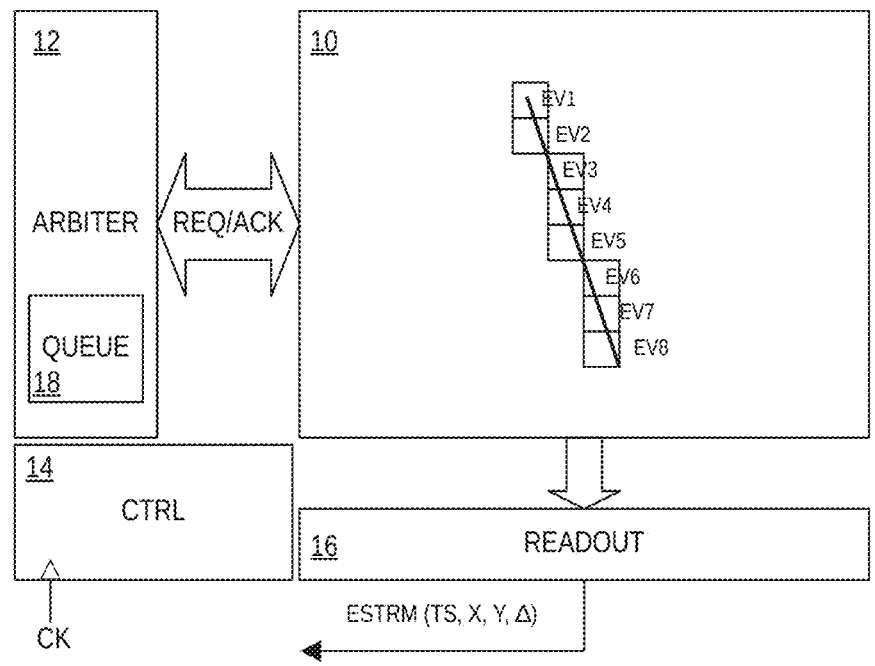
FIG. 1 is a block diagram of an event-based vision sensor organized to process events by rows in a pixel array.

In an event-based vision sensor, when a burst of events occurs, for instance upon a sudden scene brightness change, significant latency may arise between the occurrence of an event and its actual readout, introducing an error in the timestamp that is generally assigned upon readout.

Moreover, the transmitted event stream sees a burst of event data, that may cause a large traffic load on a chip-to-chip interface and a high event processing load on a host processor.

It is provided in the present disclosure to monitor event generation and transmit event burstiness information for use by downstream processing to apply compensation measures where possible.

Referring again to FIG. 1, an exemplary situation is illustrated than can cause an event burst. The sensor array 10 observes a sudden brightness variation along a line spanning eight pixels, generating eight events EV1-EV8. In this example, the pixels happen to belong to three columns and eight rows.

In a typical event-based sensor, each row of the pixel array is assigned a request line REQ monitored by the arbiter 12. A pixel that detects an event immediately enables the request line of its row, by pulling the line to an active level. Any subsequent events in the same row have no effect on the request line if the request line is already active. The arbiter eventually serves the request by enabling an acknowledge line ACK common to the row of pixels, which causes the transfer of the event data of the entire row to latches of the readout circuit 16, and the clearing of the request line. Only the data of the active events of the row are parsed by the readout circuit, and concatenated into the event stream ESTRM, together with the current timestamp TS and the X, Y coordinates provided by the positions of the active events in the read-out row and the rank of the current request line served by the arbiter.

If the arbiter does not have time to serve a request of a first row before events occur in other rows, generating subsequent requests, these subsequent requests are put into a request queue 18 and served later. The enqueuing of the requests is performed asynchronously by combinatorial logic in the arbiter. Such may be the situation for the depicted events EV1-EV8, which generate eight distinct requests asynchronously. The arbiter and control circuitry can only serve one such request at a time, synchronously, at the pace of the system clock CK. If the events occur faster than the system clock, the arbiter serves the first request and puts the others in the queue. The remaining requests are served according to a given priority rule, preferably a first-in-first-out rule. Other priority rules may be implemented, especially if it is difficult to trace the asynchronous order of occurrence of the requests, such as a fair arbitration rule based on the position of the first row served, such that a given row is served a second time only if the other rows have been served at least once.

When the arbiter eventually serves a request in the queue, it is apparent that the timestamp assigned to the corresponding event, which is the time of readout, lags behind the time of the event. The lag, translating to a timestamp error in the event stream, is variable and depends on the position of the request in the queue, which position can vary between 1 and a variable length reached by the queue. The length of the queue depends on the number of rows affected by a burst of events that occurs within one period of the system clock.

The position of a request in the queue does not, in general, provide a direct indication of the lag. Indeed, if the events occur at the same time, such as when a flash is observed in the scene, the requests will be enqueued at different positions that all represent the same time of occurrence. Hence, a position N in the queue could, upon service by the arbiter, represent any time lag between one system clock period and N clock periods.

Moreover, as a pending request awaits in the queue, a more recent event may occur in the corresponding row. Since the pending request line is still active, the new event does not change anything. Thus, a same pending request may represent different event occurrence times within the time it takes to serve the request.

It is provided herein to use an event burstiness indicator based on the queue length to apply burst mitigation measures. The burstiness indicator may simply be the current queue length, or a statistical indicator representative of the queue length evolution.

In a simple embodiment, the burstiness indicator may be inserted with the event data in the event stream, where the indicator transmitted with a current event represents the burstiness to be considered for a group of previously transmitted events. The indicator may also be communicated on an available hardware interface. A downstream processor of the sensor or application program may use the burstiness indicator to adapt the event data processing to account for the possible timestamp errors or apply processing that does not require accurate timestamps. In any case, the burstiness indicator may be used by the downstream processing to detect a return-to-normal condition after an event burst condition, where the timestamps can be trusted again. Indeed, in some situations, bursts of events may be generally ignored, whereby the timestamp information is irrelevant, but it is then useful to know when a burst condition starts and finishes.

Figure 2:
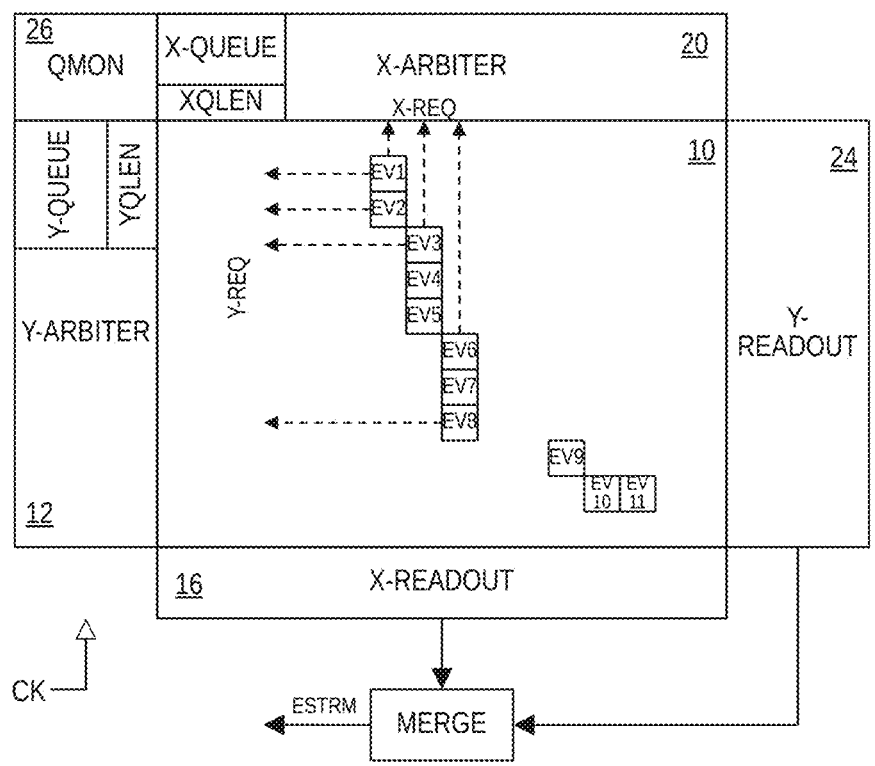
FIG. 2 is a block diagram of an event-based vision sensor implementing an embodiment of event burst mitigation based on a burstiness indicator.

FIG. 2 is a block diagram of an event-based vision sensor implementing another embodiment of event burst mitigation based on the request queue length.

The sensor is a supplemented version of that of FIG. 1, and comprises same elements, such as the pixel array 10, the row request arbiter 12, here labeled Y-ARBITER, the row readout circuit 16, here labeled X-READOUT, and the row request queue 18, here labeled Y-QUEUE. These elements preserve their previous functionality, i.e., organizing the readout of rows of pixels of the array based on pixels that activate row requests Y-REQ. In other words, these elements are configured to process horizontal lines of pixels (rows) that are aligned along the Y-axis.

In addition, the sensor comprises elements to process the array perpendicularly, along the X-axis, i.e., organizing the readout of vertical lines of pixels (columns) based on pixels that activate column requests X-REQ. These elements comprise a column request arbiter X-ARBITER 20, associated with a column request queue X-QUEUE and a column readout circuit Y-READOUT 24. The array 10 is therefore completed by a vertical column request line X-REQ connected to the x-arbiter 20 for each column of pixels, and a number of horizontal lines (not shown) connected to the y-readout circuit 24 for reading out in parallel the events of a column served by the y-arbiter 20. An event stream output by the sensor is produced by merging the outputs of the x- and y-readout circuits, which, as described later, may operate one at a time.

Basically, these additional elements operate with columns of pixels like the traditional elements operate with rows of pixels.

In addition, the control circuitry of the sensor includes a queue monitor QMON 26 that monitors both the row and column request queues Y-QUEUE, X-QUEUE, and each arbiter is assigned a queue length counter YQLEN, XQLEN. Each queue length counter may have a parallel counter structure having one input for each request line and an output encoding the number of inputs that are at an active state. For a sensor having a 1280×728 pixel array, for example, the counter YQLEN has 728 inputs and a 10-bit output for encoding any number between 0 and 727, and the counter XQLEN has 1280 inputs and an 11-bit output.

The exemplary occurrence of events EV1-EV8 is shown again in the array 10. It is assumed that these events occur simultaneously or at least within one readout cycle (or system clock period CK). According to the traditional row-approach, the events occur in eight distinct rows and thus enable eight distinct row request lines Y-REQ that cannot be served immediately. The y-arbiter puts the requests in the y-queue, which attains a size of 8 (assuming the first of the requests is not served immediately).

In parallel, the events EV1-EV8, occurring in three distinct columns, enable three distinct column request lines X-REQ. The x-arbiter connected to these request lines puts these requests in the x-queue.

Enqueuing the requests in the x- and y-queues occurs asynchronously and quasi simultaneously.

When a time comes to serve a queue, the queue monitor 26 compares the queue lengths of the x- and y-queues and enables the arbiter having the shortest queue, here the x-arbiter, for servicing its queue while the other arbiter, here the y-arbiter, is disabled and its request queue is reset. The x-arbiter then serves its three requests, representing the eight pending events in the array, saving five cycles compared to the case where the y-arbiter would have been alone to handle the events.

The following table further illustrates the above operation in successive cycles of the system clock CK.

| Time CK | Events  | Y-Queue | X-Queue | Readout    |
|---------|---------|---------|---------|------------|
| <t0     | EV1-EV8 | 8       | 3       | X:         |
| t0      |         | 0       | 2       | X: EV1, EV2|
| t1      |         | 0       | 1       | X: EV3-EV5 |
| t2      |         | 0       | 0       | X: EV6-EV8 |

Just before a cycle time t0, the events EV1-EV8 have triggered the corresponding x- and y-requests, the requests have been put in the x- and y-queues, and the queue lengths have been compared by the queue monitor QMON, here enabling the x-arbiter. These operations happen asynchronously through combinatorial logic.

At time t0, the first column of the x-queue, with events EV1 and EV2, is served, the x-queue length is decremented to 2, and the y-queue is reset.

At time t1, the next column in the x-queue, with events EV3-EV5, is served and the x-queue length is decremented to 1.

At time t2, the last column in the x-queue, with events EV6-EV8, is served and the x-queue length is decremented to 0. At this time, all requests involved in the previous comparison have been served, whereby a new comparison is initiated. In this example, no further requests have been enqueued, so the system is idle, and the queue monitor performs a comparison at each new cycle to detect a new queue length imbalance.

While the x-arbiter serves its requests, new events may occur, for instance events E9-E11 occurring in two rows and three columns, as shown in FIG. 2. For sake of clarity, it is assumed that these rows and columns differ from those of events E1-E8. As previously mentioned, both x- and y-arbiters are configured to enqueue new requests although only one is active at a time for serving its requests. In other words, the disabled arbiter continues to detect and enqueue requests to prepare for the next comparison.

The following table illustrates the additional impact of events EV9-EV11, assumed to all occur slightly before time t1.

| Time CK | Events   | Y-Queue | X-Queue   | Readout     |
|---------|----------|---------|-----------|-------------|
| <t0     | EV1-EV8  | 8       | 3         | X:          |
| t0      |          | 0       | 2         | X: EV1, EV2 |
| <t1     | EV9-EV11 | 2       | 2 + 3 = 5 |             |
| t1      |          | 2       | 4         | X: EV3-EV5  |
| t2      |          | 2       | 3         | X: EV6-EV8  |
| t3      |          | 1       | 0         | Y: EV9      |
| t4      |          | 0       | 0         | Y: EV10, EV11 |

Thus, slightly before time t1, the occurrence of events EV9-EV11 causes the arbiters to increment the y-queue by 2 and the x-queue by 3, yielding lengths 2 and 5, respectively for the y- and x-queues.

At time t1, the column with events EV3-EV5 is served and the x-queue is decremented to 4.

At time t2, the column with events EV6-EV8 is served, and the x-queue is decremented to 3. All x-requests involved in the previous comparison have been served, whereby a new comparison is enabled.

At a time t3, the queue lengths 2 and 3 are compared asynchronously, leading this time to the activation of the y-arbiter for serving its y-queue, and the resetting of the x-queue. In the same cycle, synchronously, the row with event EV9 is served and the y-queue is decremented to 1.

At time t4, the last row with events EV10 and EV11 is served, and the y-queue is decremented to 0. A new comparison is enabled.

In the preceding description, the x- and y-queue lengths were compared directly to organize the switching between the row and column operating modes. In some cases, switching between modes may cause some overhead adding a delay in processing the queues. In such circumstances, it may be preferable to switch modes when one queue length exceeds the other queue length by a threshold value greater than the eventual overhead in number of cycles.

Figure 3:
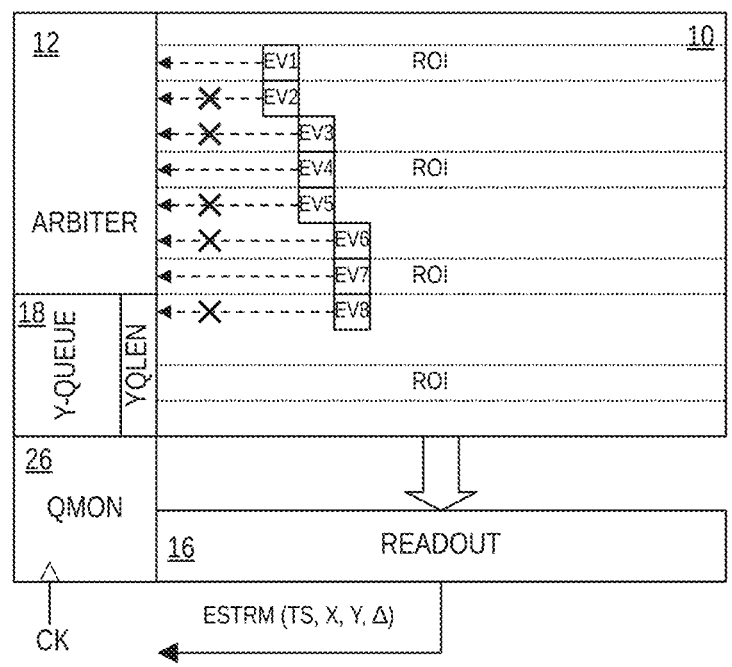
FIG. 3 is a block diagram of an event-based vision sensor illustrating another embodiment of event burst mitigation based on a burstiness indicator.

FIG. 3 is a block diagram of an event-based vision sensor illustrating another embodiment of event burst mitigation based on the queue length. The sensor may be based on a traditional structure organized to process the events by rows, and includes the queue monitor 26 and row queue length counter YQLEN of FIG. 2. The arbiter 12 and pixel array 10 are further configured to selectively implement a row sub-sampling mode.

When the current queue length exceeds a threshold, the queue monitor 26 switches the arbiter from a normal mode to a sub-sampling mode, where the arbiter serves only a limited number of requests corresponding to regions of interest ROI in the pixel array. The regions of interest may be, for example, one row every N rows, such as one row every three rows, as shown. The unserved requests in the queue are reset, i.e., cleared without readout and removed from the queue, thereby reducing the queue length. As soon as the queue length drops below the threshold, the normal mode may be resumed. Resetting the requests may be performed gradually, i.e., by resetting the unserved requests that precede the currently served request in the queue, or globally, i.e., by resetting at once all the requests in the queue that will not be served as soon as the sub-sampling mode is entered.

Such a configuration responds to a burst of events by ignoring a number of events in the burst, thus reducing the sensor resolution, in favor of a better accuracy of the timestamps.

The regions of interest may be groups of consecutive rows interspersed with groups of rows to ignore, or sub-matrices separated by groups of rows and groups of columns to ignore. In the latter case, the columns to ignore are masked upon readout of each row, potentially reducing the number of active events to transmit for each row, which will reduce the downstream processing resource consumption upon the occurrence of a burst of events.

Such a subsampling technique may be used along the two axes of the sensor of FIG. 2, i.e., both for the rows and the columns.

What is claimed is:

1. An event-based vision sensor, comprising:
   an array of event-based pixels, each pixel configured to:
      record events based on variations of a sensed photo-current, and
      enable, at an occurrence of an event, a request line common to pixels aligned along an axis of the array;
   a request arbiter configured to:

respond asynchronously to the enabled request line by enqueuing corresponding line readout requests in a request queue, and serve the request queue sequentially;

an event readout circuit connected to the request arbiter and configured to:

readout in parallel the events of a line of pixels corresponding to a current line readout request served by the arbiter, and transmit readout events with a timestamp indicative of the time of readout in an event stream;

a queue length counter connected to the request lines to produce a request queue length as a number of enabled request lines;

a queue monitor connected to the queue length counter, configured to generate an event burstiness indicator based on a current request queue length; and means configured to carry out a burstiness compensation action based on the event burstiness indicator.

2. The sensor of claim 1, wherein the readout circuit is configured to insert successive event burstiness indicator values in the event stream, and the sensor further comprises a processor receiving the event stream and programmed to apply processing measures on the event stream in response to the event burstiness indicator values.

3. The sensor of claim 1, wherein the burstiness indicator is the queue length and the arbiter is controlled, when the queue length exceeds a threshold, to subsample the request queue such that only requests corresponding to regions of interest of the pixel array are served, and to reset resulting unserved requests in the request queue.

4. The sensor of claim 1, comprising:

a row request arbiter configured to serve row readout requests enqueued in a row request queue;

a row readout circuit associated with the row request arbiter;

a column request arbiter configured to serve column readout requests enqueued in a column request queue;

a column readout circuit associated with the column request arbiter;

a row queue length counter and a column queue length counter respectively assigned to the row and column request queues;

a request queue monitor associated with the row and column request arbiters, to:

activate the row request arbiter for serving the row request queue when a row request queue length exceeds a column request queue length by a threshold; and activate the column request arbiter for serving the column request queue when the column request queue length exceeds the row request queue length by a threshold.

5. The sensor of claim 4, wherein the row and column request arbiters are configured to operate simultaneously to enqueue the respective row and column readout requests and the request queue monitor is configured to reset the request queue of an arbiter switched from an active state to an inactive state.

* * * * *